United States Patent
Tsuji

(10) Patent No.: US 10,434,875 B2
(45) Date of Patent: Oct. 8, 2019

(54) CONTROL APPARATUS FOR LIMITED-SLIP DIFFERENTIAL FOR FRONT AND REAR WHEELS OF VEHICLE

(71) Applicant: SUBARU CORPORATION, Tokyo (JP)

(72) Inventor: Taichi Tsuji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/943,110

(22) Filed: Apr. 2, 2018

(65) Prior Publication Data

US 2018/0290540 A1    Oct. 11, 2018

(30) Foreign Application Priority Data

Apr. 6, 2017    (JP) .................................. 2017-075954

(51) Int. Cl.
| | |
|---|---|
| *B60K 23/08* | (2006.01) |
| *B60K 23/04* | (2006.01) |
| *F16H 48/34* | (2012.01) |
| *F16H 48/22* | (2006.01) |

(Continued)

(52) U.S. Cl.
CPC .......... *B60K 23/04* (2013.01); *B60K 17/3462* (2013.01); *B60K 23/0808* (2013.01); *F16H 48/20* (2013.01); *F16H 48/22* (2013.01); *F16H 48/34* (2013.01); *B60K 2023/043* (2013.01); *B60K 2023/0841* (2013.01);

(Continued)

(58) Field of Classification Search
None
See application file for complete search history.

(56) References Cited

U.S. PATENT DOCUMENTS 5,740,877 A *  4/1998  Sasaki ................ B60K 23/0808
                                              180/248
2002/0002433 A1    1/2002  Matsuno
                    (Continued)

FOREIGN PATENT DOCUMENTS

| DE | 10 2007 044 452 A1 | 4/2008 |
|---|---|---|
| JP | 2720698 B2 | 3/1998 |
| JP | 2002-012049 A | 1/2002 |

OTHER PUBLICATIONS

Japanese Office Action, dated May 21, 2019, in Japanese Application No. 2017-075954 and English Translation thereof.

*Primary Examiner* — Justin Holmes
(74) *Attorney, Agent, or Firm* — McGinn IP Law Group, PLLC.

(57) ABSTRACT

A control apparatus for a limited-slip differential for front and rear wheels of a vehicle, the control apparatus includes: a basic LSD torque calculation module configured to calculate a basic LSD torque at least on the basis of a transfer input torque; a subtraction LSD torque calculation module configured to calculate a subtraction LSD torque that is subtracted from the basic LSD torque at least on the basis of a vehicle speed and a steering angle; a minimum LSD torque calculation module configured to calculate a minimum LSD torque on the basis of the transfer input torque; a target LSD torque setting module configured to set a target LSD torque at least on the basis of the basic, subtraction, and minimum LSD torques; and a clutch control module configured to control an engaging force of a clutch.

17 Claims, 6 Drawing Sheets

(51) Int. Cl.
*F16H 48/20* (2012.01)
*B60K 17/346* (2006.01)
(52) U.S. Cl.
CPC .. *F16H 2048/204* (2013.01); *F16H 2048/205* (2013.01); *F16H 2048/207* (2013.01)

(56) References Cited

U.S. PATENT DOCUMENTS

| | | | | |
|---|---|---|---|---|
| 2002/0107628 | A1* | 8/2002 | Sakakiyama | B60K 23/08 701/89 |
| 2007/0017725 | A1* | 1/2007 | Yoneda | B60K 17/35 180/247 |
| 2009/0248268 | A1* | 10/2009 | Shigeta | B60K 23/0808 701/72 |
| 2011/0035090 | A1* | 2/2011 | Noguchi | B60W 10/119 701/31.4 |
| 2012/0029779 | A1* | 2/2012 | Dickinson | F16H 48/32 701/69 |
| 2014/0297146 | A1* | 10/2014 | Murakami | B60K 23/0808 701/69 |

* cited by examiner

CONTROL APPARATUS FOR LIMITED-SLIP DIFFERENTIAL FOR FRONT AND REAR WHEELS OF VEHICLE

CROSS-REFERENCE TO RELATED APPLICATIONS

The present application claims priority from Japanese Patent Application No. 2017-075954 filed on Apr. 6, 2017, the entire contents of which are hereby incorporated by reference.

BACKGROUND

1. Technical Field

The present invention relates to a control apparatus for a limited-slip differential for front and rear wheels of a vehicle.

2. Related Art

All-wheel-drive (AWD) vehicles (which are also referred to as 4-wheel-drive (4WD) vehicles) exhibiting excellent running performance on steep sloping roads, badly uneven roads, or slippery road surfaces such as snowy roads, muddy roads, and the like have been put to widespread use. Among such AWD vehicles, some vehicles include a center differential that transmits drive torques to front and rear wheels while allowing a difference (differential) in rotation between the front wheels and the rear wheels for the purpose of preventing a braking phenomenon caused by the differential rotation of the four wheels, for instance, when a steering wheel is turned sharply. Meanwhile, when some wheels of an AWD vehicle in which such a center differential is mounted run idly on a slippery road surface, for instance, the center differential differentially rotates to prevent torques which are transmitted to the other wheels from being zero. A center differential includes, for instance, a limited slip differential (LSD) which limits a differential of the center differential (differential between front and rear wheels) and transmits a driving force to non-slipping wheels.

The limited slip differential controls a differential state of the center differential by, for instance, adjusting an engaging force of an LSD clutch (which will also be referred to as an "LSD torque" below) provided in the center differential. For instance, limitation on a differential of the center differential may be prevented by weakening the LSD torque and thereby the braking phenomenon can be curbed, and a differential of the center differential is limited by strengthening the LSD torque and thereby a slip phenomenon can be curbed. The LSD torque can be adjusted by, for instance, controlling hydraulic pressures to be supplied to a center clutch using a solenoid valve.

The above-mentioned braking phenomenon, which is also called a tight corner braking phenomenon, easily occurs in a case in which a steering angle of a steering wheel is large particularly at a low vehicle speed. Thus, the LSD torque is controlled on the basis of, for instance, a vehicle speed and a steering angle of a steering wheel. The LSD torque is weakened as a vehicle speed becomes lower or a steering angle of a steering wheel becomes larger, and accordingly the tight corner braking phenomenon is easily curbed.

Japanese Patent No. 2720698, for instance, discloses a technology for calculating an LSD torque using a transfer function given with respect to a vehicle speed, a steering angle of a steering wheel, a gradient of a road surface, and a 4-wheel slip in a tight corner mode. In Japanese Patent No. 2720698, a control quantity element that readily enhances transfer of a driving force onto a road surface is neglected and a control quantity element that readily enhances steering characteristics is emphasized in the tight corner mode.

SUMMARY OF THE INVENTION

An aspect of the present invention provides a control apparatus for a limited-slip differential for front and rear wheels of a vehicle. The control apparatus includes: a basic LSD torque calculation module configured to calculate a basic LSD torque at least on a basis of a transfer input torque; a subtraction LSD torque calculation module configured to calculate a subtraction LSD torque that is subtracted from the basic LSD torque at least on a basis of a vehicle speed and a steering angle; a minimum LSD torque calculation module configured to calculate a minimum LSD torque on the basis of the transfer input torque; a target LSD torque setting module configured to set a target LSD torque at least on a basis of the basic LSD torque, the subtraction LSD torque, and the minimum LSD torque; and a clutch control module configured to control an engaging force of a clutch configured to freely limit a differential of front and rear wheels in accordance with the engaging force on a basis of the target LSD torque. An aspect of the present invention provides control apparatus for a limited-slip differential for front and rear wheels of a vehicle. The control apparatus circuitry configured to calculate a basic LSD torque at least on a basis of a transfer input torque, calculate a subtraction LSD torque that is subtracted from the basic LSD torque at least on a basis of a vehicle speed and a steering angle, calculate a minimum LSD torque on the basis of the transfer input torque, set a target LSD torque at least on a basis of the basic LSD torque, the subtraction LSD torque, and the minimum LSD torque, and control an engaging force of a clutch configured to freely limit a differential of the front and rear wheels in accordance with the engaging force on a basis of the target LSD torque.

DETAILED DESCRIPTION

Figure 1:
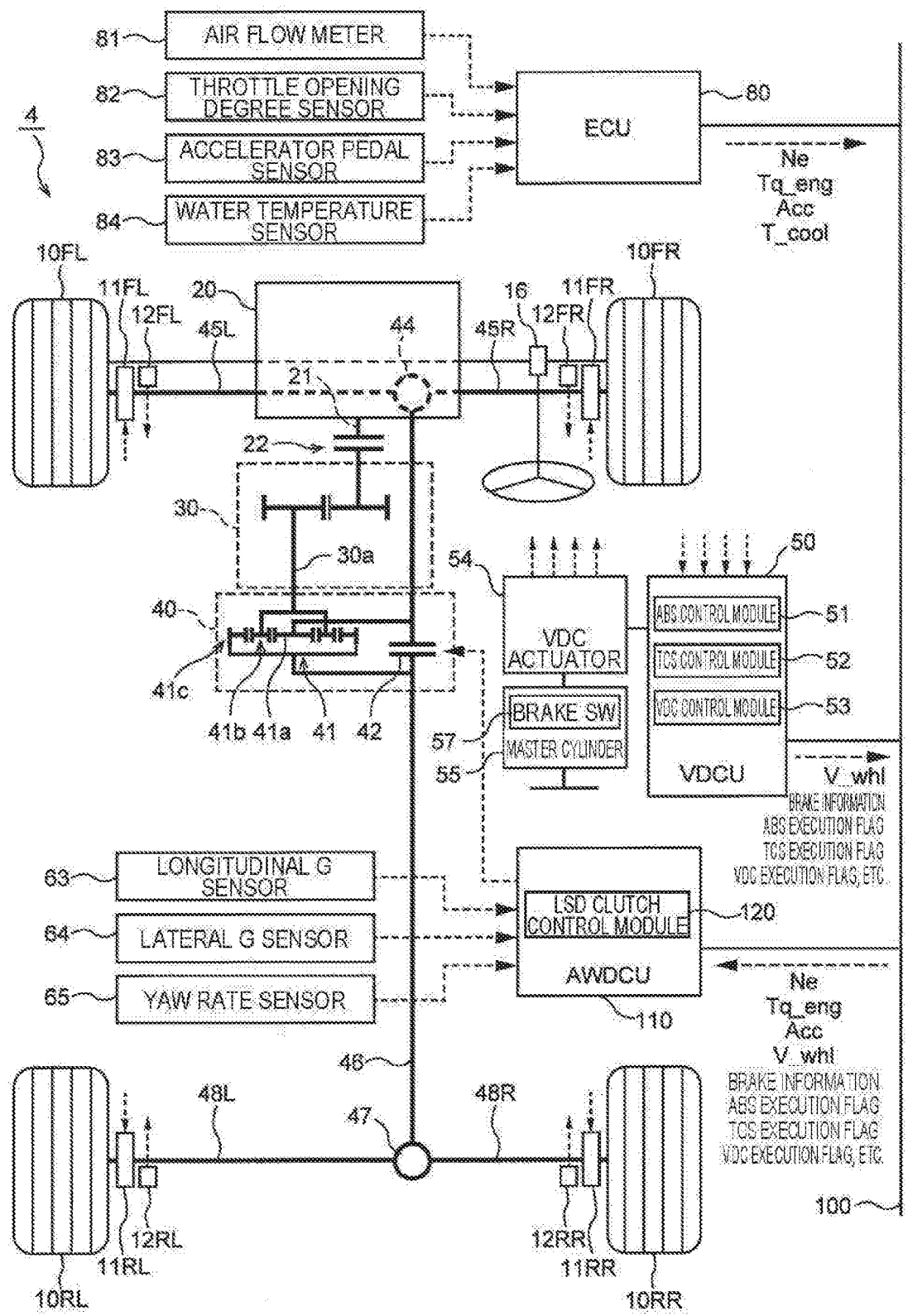
FIG. 1 is an explanatory diagram illustrating an example of an overall configuration of a power train and a driving force transmission system of an AWD vehicle in which a control apparatus for a limited-slip differential for front and rear wheels of a vehicle according to an example of the present invention is mounted.

Hereinafter, preferred examples of the present invention will be described in detail with reference to the appended drawings. Note that, in this specification and the appended drawings, structural elements that have substantially the same function and structure are denoted with the same reference numerals, and repeated description of these structural elements is omitted.

In a situation in which the friction of a dry asphalt road surface or the like is considerable, for instance, it is unlikely that the slip phenomenon will occur but it is necessary to set the LSD torque to be weak in order to curb the tight corner braking phenomenon. On the other hand, in a situation in which the friction of a frozen road surface or the like is small, it is unlikely that the tight corner braking phenomenon will occur but it is desirable to set the LSD torque to be strong in order to curb the slip phenomenon. However, it is difficult to instantaneously ascertain the road surface friction as well as to adjust to an appropriate LSD torque on the basis of a vehicle speed and a steering angle of the steering wheel and thereby to control curb of the tight corner braking phenomenon and the slip phenomenon with a proper balance.

It is desirable to provide an improved and novel control apparatus for a limited-slip differential for front and rear wheels of a vehicle that can curb the tight corner braking phenomenon and the slip phenomenon with a proper balance by adjusting the LSD torque.

<1. System Configuration of Vehicle>

First, a configuration of a control apparatus 110 for a limited-slip differential for front and rear wheels of a vehicle according to the present example (which will also be referred to as an "AWDCU" below) will be described with reference to FIG. 1. FIG. 1 is an explanatory diagram illustrating a configuration of a power train and a driving force transmission system of an all-wheel drive (AWD) vehicle 4 in which the AWDCU 110 is mounted. The AWD vehicle 4 according to the present example is a full-time AWD vehicle in which a center differential unit 40 with a limited-slip differential (LSD) function is mounted. Hereinbelow, an example of the full-time AWD vehicle 4 with a cooperative control function for LSD control of the center differential unit 40 and traction control of a traction control system (TCS) will be described.

A 4-cylinder horizontally-opposed gasoline engine of a cylinder injection type, for instance, can be employed as an engine 20, however, the engine is not limited thereto. In the engine 20, air sucked through via an air cleaner, which is not illustrated, is throttled by an electrically controlled throttle valve included in an intake pipe, passes through intake manifolds, and then is sucked into each of the cylinders included in the engine 20. Here, the amount of the air sucked through the air cleaner is detected by an air flow meter 81. Furthermore, the throttle valve includes a throttle opening degree sensor 82 that detects an opening degree of the throttle valve.

An injector that injects fuel, which is not illustrated, is installed in each of the cylinders of the engine 20. In addition, a spark plug that ignites an air-fuel mixture and a coil with an igniter that applies a high voltage to the spark plug are installed in each of the cylinders. In each of the cylinders, an air-fuel mixture including sucked air and fuel injected by the injector are ignited by the spark plug and combusted. Exhaust gas after combustion is discharged through an exhaust pipe.

In addition to the above-described air flow meter 81 and throttle opening degree sensor 82, a cam angle sensor for distinguishing cylinders of the engine 20 is installed in the vicinity of a cam shaft of the engine 20. In addition, a crank angle sensor for detecting a position of a crank shaft is installed in the vicinity of the crank shaft of the engine 20. These sensors are coupled to an engine control unit (which will also be referred to as an "ECU" below) 80. In addition, various sensors such as an accelerator pedal sensor 83 for detecting an amount of depressing of the accelerator pedal, i.e., an accelerator pedal opening degree Acc, and a water temperature sensor 84 for detecting a temperature of cooling water T_cool of the engine 20 are coupled to the ECU 80 as well.

An output shaft (the crank shaft) 21 of the engine 20 is coupled to a manual transmission (MT) 30 that converts and outputs a driving force from the engine 20 via, for instance, a dry clutch 22. The manual transmission 30 is a transmission for manual shift operations, and for instance, a transmission with concentric input and output shafts may be used. As the manual transmission 30, a known transmission, i.e., a transmission that is connected to a shift lever, in which a drive gear and a driven gear of each shift stage are disposed on two axes, and a synchronization mechanism, a coupling sleeve that causes the synchronization mechanism to operate, a shift fork, a striking rod, and the like are disposed in the vicinity of the gears, can be used. Note that, instead of the manual transmission (MT), for instance, another type of transmission such as an automatic transmission (AT), a continuously variable transmission (CVT), or a dual clutch transmission (DCT) may be used.

The center differential unit 40 is coupled to an output shaft 30*a* of the manual transmission 3. A driving force converted by the manual transmission 30 is distributed to be transmitted to a front drive shaft 43 and a propeller shaft 46 by the center differential unit 40. As the center differential unit 40, a system in which an LSD mechanism including a multi-plate clutch (which will also be referred to as an "LSD clutch") 42 is combined with a center differential 41 including a planetary gear unit for a front-rear unequal torque distribution and an engaging force (LSD torque, i.e., LSD strength) of the LSD clutch 42 can be electrically adjusted is employed in the present example.

In the center differential unit 40, stability is ensured while a large driving force is exhibited due to the front-rear torque distribution by the LSD clutch 42 in accordance with a running situation, for instance, based on a torque distribution of 41% to the front wheels and 59% to the rear wheels.

More specifically, the center differential 41 includes a sun gear 41*a*, a planetary pinion (also called a planetary carrier) 41*b*, and a ring gear (also called an internal gear) 41*c*. The planetary pinion 41*b* is coupled to the output shaft 30*a* of the manual transmission 30, and receives a driving force transmitted from the engine 20. The sun gear 41*a* is coupled to the front drive shaft 43 and transmits the driving force to the front wheel side. The ring gear 41*c* is coupled to the propeller shaft 46 and transmits the driving force to the rear wheel side. Note that connection relationships between each of the elements of the center differential 41 and the output shaft 30*a*, the front drive shaft 43, and the propeller shaft 46 are not limited to the above-described example, and any association thereof is applicable.

In addition, in the center differential unit 40, the LSD clutch (the multi-plate clutch) 42 that performs differential limitation is incorporated between the ring gear 41*c*, which performs output to the rear wheels 10RL and 10RR, and the sun gear 41*a*, which performs output to the front wheels 10FL and 10FR. An engaging force is applied from electromagnetic solenoids that are installed to face each other with the LSD clutch 42 interposed therebetween. Note that, in addition to the above-described configuration, a cam mechanism that raises an engaging force of the clutch using a torque difference is also incorporated in the center differential unit 40 in order to generate a differential limiting force at a moment at which there is a difference between road surface reactions.

The LSD clutch 42 varies a torque distribution to the front and rear wheels in accordance with an engaging force and fulfills the differential limitation function. As the LSD clutch 42, for instance, an electromagnetic clutch that can electrically adjust engaging forces or the like is used. An engaging force (differential limitation) of the LSD clutch 42 is controlled by the AWDCU 110. Note that the LSD clutch 42 is not limited to the above-described electromagnetic clutch, and for instance, a clutch that can adjust an engaging force with a solenoid valve adjusting a supplied oil pressure can be used.

As described above, an input (a driving force) from the manual transmission 30 is transmitted to the planetary gear unit 41, output from the sun gear 41a to the front wheels 10FL and 10FR, and output from the outer ring gear 41c to the rear wheels 10RL and 10RR. More specifically, a driving force from the manual transmission 30 is transmitted to the planetary pinion 41b, and then transmitted from the sun gear 41a to a front differential 44 via the front drive shaft 43. The front differential 44 is, for instance, a bevel gear differential device. The driving force from the front differential 44 is transmitted to the left front wheel 10FL via a left front wheel drive shaft 45L and to the right front wheel 10FR via a right front wheel drive shaft 45R.

Meanwhile, the driving force transmitted to the planetary gear unit 41 is transmitted from the outer ring gear 41c to a rear differential 47 via the propeller shaft 46. The rear differential 47 is coupled to a left rear wheel drive shaft 48L and a right rear wheel drive shaft 48R. The driving force from the rear differential 47 is transmitted to the left rear wheel 10RL via the left rear wheel drive shaft 48L and to the right rear wheel 10RR via the right rear wheel drive shaft 48R.

Brakes 11FL, 11FR, 11RL, and 11RR that brake the wheels 10FL to 10RR (all of the brakes 11FL to 11RR may be referred to collectively as brakes 11 below) are attached to the wheels 10FL, 10FR, 10RL, and 10RR (all of the wheels 10FL to 10RR may be referred to collectively as wheels 10 below) respectively. In addition, wheel speed sensors 12FL, 12FR, 12RL, and 12RR for detecting wheel rotation speeds (all of the wheel speed sensors 12FL to 12RR may be referred to collectively as wheel speed sensors 12 below) are attached to the wheels 10FL to 10RR respectively.

In the present example, disc brakes are used for the brakes 11. Each of the brakes 11 includes a brake disc attached to each wheel 10 of the AWD vehicle 4, and a brake caliper into which brake pads and wheel cylinders are built. At the time of braking, the brake pads are pressed against the brake disc by hydraulic pressures, and the wheel 10 connected with the brake disc is braked due to a friction force. Note that, although disc brakes are used for the brakes 11 in the present example, the brakes 11 is not limited to disc brakes, and drum brakes that brake the wheels by pressing friction materials against inner circumferential surfaces of drums may be used.

The wheel speed sensors 12 are non-contact sensors for detecting a change in a magnetic field caused by a rotor (a gear rotor or a magnet rotor) rotating along with the wheels 10, and may be, for instance, of a semiconductor type for detecting rotation of the rotor using a Hall element or a magnetic resistance (MR) element.

In addition, a traction control system (TCS), an anti-lock brake system (ABS), and a vehicle behavior stabilization system or a vehicle dynamics system (VDC) are mounted in the AWD vehicle 4. The TCS is a system that executes traction control for curbing slipping by reducing a driving force with respect to the wheels 10 by performing engine torque-down control or brake control in a case in which the wheels 10 are driven and wheel slipping occurs during acceleration of the vehicle. The anti-lock brake system is a system that prevents wheel lock from occurring at the time of sudden braking or braking on a slippery road surface, and ensures directional stability and steering performance at the time of braking by maintaining a suitable slip ratio for each of the wheels 10 to obtain an optimum braking force. The vehicle behavior stability system or VDC is a system that detects skidding of the front or rear wheels and controls a braking force of each of the wheels 10 and an engine output to stabilize vehicle behavior or reduce skidding.

Control of an engaging force (differential limitation) of the LSD clutch 42 is executed by the AWDCU 110 as described above. Here, the AWDCU 110 is communicatively coupled to an ECU 80 that comprehensively controls the engine 20, a VDC control device (VDCU) 50, and the like via, for instance, a communication bus such as a controller area network (CAN) 100.

Each of the AWDCU 110, the ECU 80, and the VDCU 50 includes a microcomputer that perform arithmetic operations, a read only memory (ROM) that stores a program for causing the microcomputer to execute processing and the like, a random access memory (RAM) that stores various kinds of data such as arithmetic operation results, a backup RAM that saves stored content using a battery, an input/output interface, and the like.

The ECU 80 distinguishes cylinders by using an output of a cam angle sensor and obtains the engine speed Ne from a change in rotation phase of a crank shaft detected by using the output of a crank angle sensor. In addition, the ECU 80 acquires various kinds of information such as an amount of intake air, an accelerator pedal opening degree Acc, an air-fuel ratio of an air-fuel mixture, and an engine water temperature (cooling water temperature) T_cool, and the like on the basis of detection signals input from the above-described various sensors. In addition, the ECU 80 comprehensively controls the engine 20 by controlling an amount of fuel injection, a spark timing, and various devices such as the throttle valve on the basis of the acquired various kinds of information. Furthermore, the ECU 80 transmits various kinds of information such as the engine speed Ne, the accelerator pedal opening degree Acc, an engine shaft torque Tq_eng, the engine water temperature T_cool, and the like to the AWDCU 110, and the like via the CAN 100.

The VDCU 50 is coupled to the four wheel speed sensors 12FL to 12RR, a brake switch 57, and the like. The wheel speed sensors 12FL to 12RR detect rotations of gears attached to the centers of the wheels 10FL to 10RR using magnetic pickups or the like and thereby detect rotation states of the wheels 10FL to 10RR as described above. In addition, the VDCU 50 acquires information of a steering angle, a longitudinal acceleration, a lateral acceleration, a yaw rate, and the like from the AWDCU 110 via the CAN 100.

The VDCU 50 includes an ABS control module 51 that has an ABS function, a TCS control module 52 that has a TCS function, and a VDC control module 53 that has a VDC function. Each of the modules may have a function realized through execution of a program by the microcomputer. The ABS control module 51 estimates a slip state of each of the wheels 10FL to 10RR, drives a VDC actuator 54 provided between a master cylinder 55 and a wheel cylinder, and independently controls brake hydraulic pressures of each of the wheels 10FL to 10RR at the time of braking. The VDC actuator 54 adjusts the hydraulic pressures of the wheel cylinders at the time of braking complying with a control command from the ABS control module 51 of the VDCU 50.

The TCS control module 52 curbs idling of driving wheels caused by a slippery road surface or an excessive driving force and thereby ensures vehicle stability and acceleration characteristics when the vehicle starts or accelerates. Thereby, the VDC actuator 54 has a function of automatically pressurizing the individual wheels 10FL to 10RR.

The VDC control module 53 prevents skidding and thereby ensures an excellent running stability when, for instance, the vehicle enters a corner at an overspeed or when a vehicle attitude (behavior) is disturbed by an abrupt operation of the steering wheel. The VDC control module 53 detects a vehicle attitude and the like by using various sensors and performs automatic control in accordance with driving conditions by applying the brake to the front wheel positioned on the outer side of the corner when oversteering is determined, and conversely, by lowering the output of the engine 20 and applying the brake to the rear wheel positioned on the inner side of the corner when understeering is determined.

The VDCU 50 transmits information of a detected wheel speed V_whl of each of the wheels 10FL to 10RR, information representing whether ABS control, TCS control, or VDC control is being executed (e.g., an ABS execution flag, a TCS execution flag, or a VDC execution flag), brake information, and the like to the AWDCU 110, and the like via the CAN 100.

The AWDCU 110 is coupled to a steering angle sensor 16, a longitudinal acceleration (longitudinal G) sensor 63, a lateral acceleration (lateral G) sensor 64, a yaw rate sensor 65, and the like. The longitudinal acceleration sensor 63 detects acceleration acting on the AWD vehicle 4 in the longitudinal direction (which will also be referred to simply as "acceleration" below), and the lateral acceleration sensor 64 detects acceleration acting on the AWD vehicle 4 in the lateral direction. The steering angle sensor 16 detects a steering angle θ_str of the front wheels 10FL and 10FR which are steered wheels by detecting a rotation angle of a pinion shaft. The yaw rate sensor 65 detects a yaw rate of the AWD vehicle 4.

In addition, the AWDCU 110 receives speeds of the wheels 10, information representing whether ABS control, TCS control, or VDC control is being executed (e.g., the ABS execution flag, the TCS execution flag, or the VDC execution flag), the brake information, and the like from the VDCU 50 via the CAN 100. Furthermore, the AWDCU 110 receives information of the engine speed Ne, the accelerator pedal opening degree Acc, the engine shaft torque Tq_eng, and the like from the ECU 80 via the CAN 100. Meanwhile, the AWDCU 110 transmits the acquired information of the steering angle θ_str, longitudinal acceleration, lateral acceleration, yaw rate, and the like to the VDCU 50, the ECU 80, and the like via the CAN 100.

The AWDCU 110 controls an engaging force of the LSD clutch 42 (which will also be referred to as "LSD clutch control" below) on the basis of the above-described information acquired from the various sensors and the like and the various kinds of information acquired via the CAN 100. The LSD clutch control also includes the purpose of differential limitation control or torque distribution control. When a program stored in the ROM of the AWDCU 110 is executed by the microcomputer thereof, a function of an LSD clutch control module 120 is realized.

<2. LSD Clutch Control>

Figure 2:
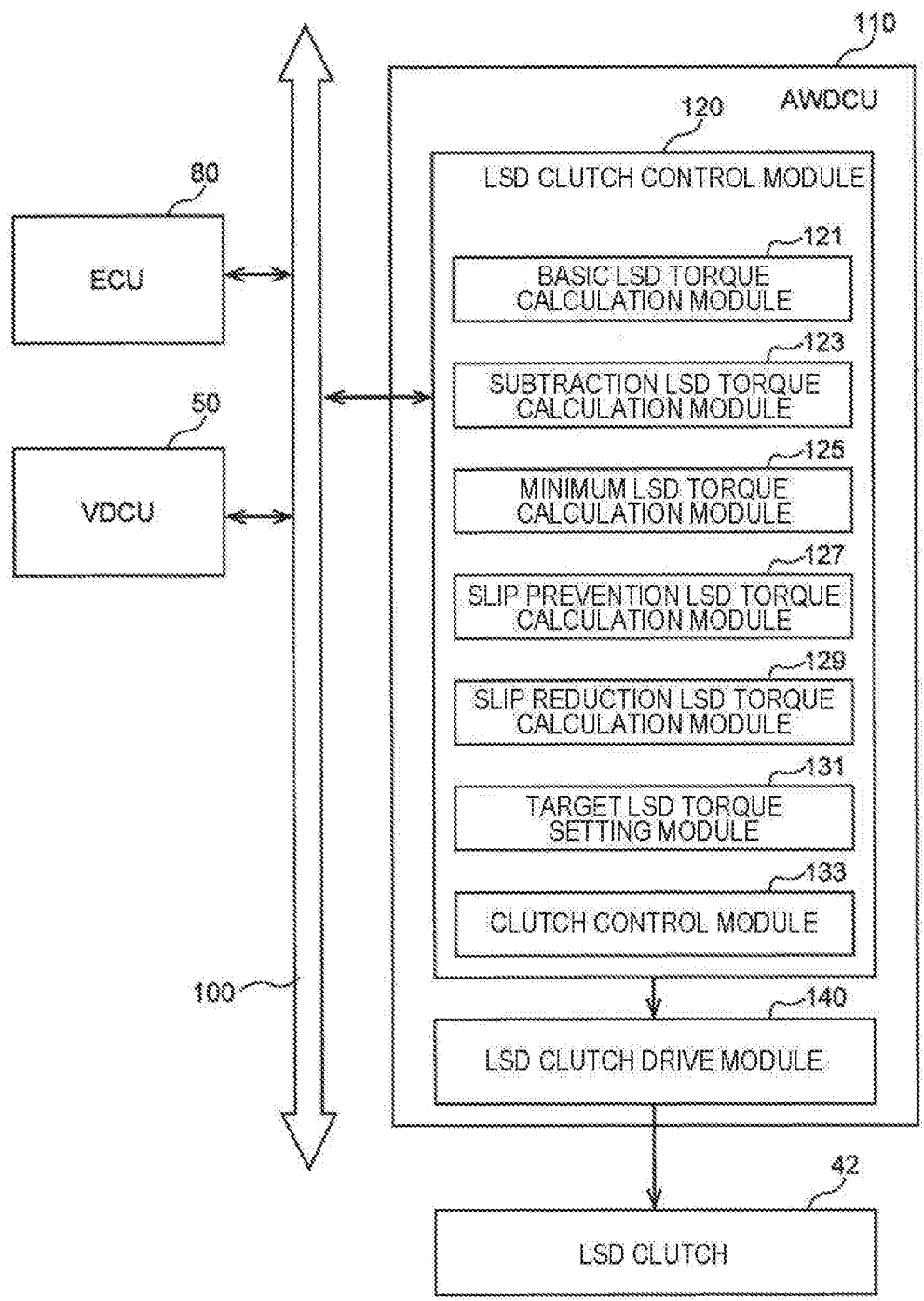
FIG. 2 is a block diagram illustrating an example of a configuration of the control apparatus for the limited-slip differential for front and rear wheels of the vehicle according to the example.

Next, the LSD clutch control module 120 of the AWDCU 110 according to the present example will be described in detail with reference to FIG. 2. The LSD clutch control module 120 controls an engaging force (a target LSD torque) of the LSD clutch 42 by adjusting the power applied to the LSD clutch 42. The LSD clutch control module 120 includes, for instance, each of a basic LSD torque calculation module 121, a subtraction LSD torque calculation module 123, a minimum LSD torque calculation module 125, and a slip prevention LSD torque calculation module 127 for a function of calculating an LSD torque for curbing slip of the AWD vehicle 4 beforehand. In addition, the LSD clutch control module 120 includes a slip reduction LSD torque calculation module 129, for instance, as a functional configuration for calculating an LSD torque for reducing slip that may occur to the AWD vehicle 4.

Furthermore, the LSD clutch control module 120 includes a target LSD torque setting module 131 that sets a target LSD torque Tq_lsd_set that is a torque to be applied to the LSD clutch 42 and a clutch control module 133 that outputs a drive instruction signal with respect to the LSD clutch 42 to an LSD clutch drive module 140 on the basis of the set target LSD torque Tq_lsd_set. The LSD clutch drive module 140 includes, for instance, a drive circuit, and drives the electromagnetic solenoids of the LSD clutch 42 on the basis of a drive instruction signal from the clutch control module 133.

The basic LSD torque calculation module 121 calculates an LSD torque Tq_lsd_A for input-torque-sensitive control and a basic LSD torque Tq_lsd_B on the basis of a control factor α for slip-angular-velocity-sensitive control. In the input-torque-sensitive control, slip of the wheels 10FL to 10RR is curbed by increasing an LSD torque when a transfer input torque that is a torque input to the center differential unit 40 is large. The control factor α for the slip-angular-velocity-sensitive control is set on the basis of the difference between a yaw rate (a course angular velocity) calculated on the basis of a vehicle speed V and lateral acceleration and an actual yaw rate acquired from the yaw rate sensor 65.

The subtraction LSD torque calculation module 123 calculates a subtraction LSD torque Tq_lsd_C for curbing the tight corner braking phenomenon on the basis of the information of the vehicle speed V and the steering angle θ_str of the steering wheel. The tight corner braking phenomenon easily occurs in a case in which the vehicle speed is low and the steering angle θ_str of the steering wheel is large, and can be curbed by increasing the subtraction LSD torque Tq_lsd_C as the vehicle speed V becomes lower or the steering angle θ_str of the steering wheel becomes larger and thereby reducing the target LSD torque Tq_lsd_set.

The minimum LSD torque calculation module 125 sets a minimum of an LSD torque Tq_lsd_D obtained by subtracting the subtraction LSD torque Tq_lsd_C from the basic LSD torque Tq_lsd_B in order to prevent the target LSD torque Tq_lsd_set from being excessively small due to the subtraction LSD torque Tq_lsd_C for curbing the tight corner braking phenomenon. The minimum LSD torque calculation module 125 calculates the minimum LSD torque Tq_lsd_min on the basis of the transfer input torque. While it is difficult to instantaneously detect road surface friction, the transfer input torque can be obtained on the basis of an engine shaft torque Tq_eng and a transmission gear ratio of the transmission, and by setting the minimum LSD torque Tq_lsd_min on the basis of the transfer input torque, it is possible to prevent the LSD torque from being excessively small in a situation in which the wheels 10 more easily slip.

For instance, the minimum LSD torque calculation module 125 may set a value obtained by multiplying the value of the basic LSD torque Tq_lsd_B obtained by the basic LSD torque calculation module 121 by a predetermined ratio as the minimum LSD torque Tq_lsd_min. The basic LSD torque Tq_lsd_B is a value proportional to the LSD torque Tq_lsd_A for the input-torque-sensitive control, and the value of the minimum LSD torque Tq_lsd_min is a value corresponding to the transfer input torque. The minimum LSD torque Tq_lsd_min may be set to, for instance, 15% of the basic LSD torque Tq_lsd_B.

Slip of the wheels 10FL to 10RR occurs more easily as the transfer input torque becomes larger, such as in a case in which the engine shaft torque Tq_eng is large, the vehicle is downshifted, or the like. For this reason, in a case in which the transfer input torque is large, it is necessary to set the LSD torque to be strong. In addition, a case in which the transfer input torque is large corresponds to a state in which the driver has an intention of acceleration, and thus the driver can tolerate the tight corner braking phenomenon to some degree at the expense of the feeling of driving. On the other hand, in a case in which the transfer input torque is small, that is, in a case in which the tight corner braking phenomenon occurs when the drive has no intention of acceleration, the driver may feel significant discomfort. Therefore, by setting the minimum LSD torque Tq_lsd_min to a value proportional to the transfer input torque, curb of both the tight corner braking phenomenon and the slip phenomenon of the wheels 10 can be achieved.

Note that the minimum LSD torque Tq_lsd_min may be set to a value proportional to the transfer input torque, and calculation of the value is not limited to multiplication of the basic LSD torque Tq_lsd_B by a predetermined ratio.

The slip prevention LSD torque calculation module 127 calculates an LSD torque (a slip prevention LSD torque) Tq_lsd_E for preventing slip of the AWD vehicle 4 in accordance with, for instance, a current driving condition of the AWD vehicle 4. The slip prevention LSD torque Tq_lsd_E may include, for instance, an LSD torque for tack-in control and an initial LSD torque in accordance with the vehicle speed V.

The tack-in control is to curb slip of the wheels 10FL to 10RR by increasing the LSD torque in a case in which the accelerator pedal is suddenly released when lateral acceleration of the vehicle body is high or the like. The LSD torque for tack-in control is calculated on the basis of information of lateral acceleration of the vehicle body and the accelerator pedal opening degree Acc. The initial LSD torque increases when the vehicle speed V is high, and curbes slip of the wheels 10FL to 10RR. The slip prevention LSD torque calculation module 127 may calculate at least one of the LSD torque for tack-in control or the initial LSD torque, or may further calculate another LSD torque for curbing slip. However, the slip prevention LSD torque Tq_lsd_E such as the LSD torque for tack-in control, the initial LSD torque, or the like can be a value approximate to zero when the vehicle speed V is low.

The slip reduction LSD torque calculation module 129 calculates an LSD torque (a slip reduction LSD torque) Tq_lsd_F for reducing slip that is occurring in the AWD vehicle 4 in accordance with the slip state of the AWD vehicle 4. The slip reduction LSD torque Tq_lsd_F may include, for instance, an LSD torque for steering-angle/yaw-rate-sensitive control and an LSD torque for slip control. In the steering-angle/yaw-rate-sensitive control, vehicle stability can be improved by increasing or decreasing the LSD torque in accordance with the steering angle θ_str, the vehicle speed V, the lateral acceleration, and the yaw rate. In the slip control, slip of each of the wheels 10 is detected based on a detection value of the wheel speed sensor 12 of each of the wheels 10, and the slip that is occurring is reduced by strengthening the LSD torque in accordance with the slip state. The slip reduction LSD torque calculation module 129 may calculate at least the LSD torque for steering-angle/yaw-rate-sensitive control or the LSD torque for slip control, or may further calculate another LSD torque for a slip reduction. However, the LSD torque for the steering-angle/yaw-rate-sensitive control can be a value approximate to zero when the vehicle speed V is low.

The target LSD torque setting module 131 sets a target LSD torque Tq_lsd_set for driving the LSD clutch 42 on the basis of the LSD torques each calculated by the basic LSD torque calculation module 121, the subtraction LSD torque calculation module 123, the minimum LSD torque calculation module 125, the slip prevention LSD torque calculation module 127, and the slip reduction LSD torque calculation module 129. When the target LSD torque setting module 131 sets the target LSD torque Tq_lsd_set, the clutch control module 133 outputs a drive instruction signal of the target LSD torque Tq_lsd_set to the LSD clutch drive module 140. Accordingly, the LSD clutch 42 is driven by the LSD clutch drive module 140 and is adjusted to have a desired engaging force.

Figure 3:
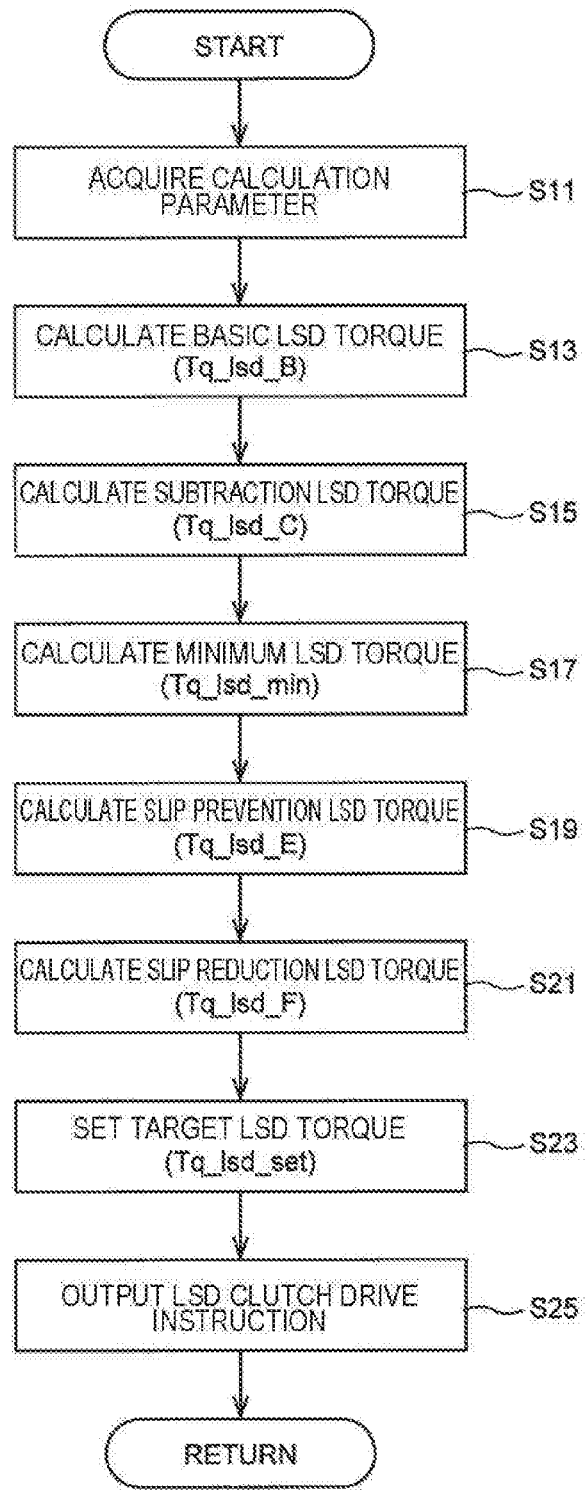
FIG. 3 is a flowchart illustrating a processing procedure for control of an LSD clutch by the control apparatus for the limited-slip differential for front and rear wheels of the vehicle according to the example.
Figure 4:
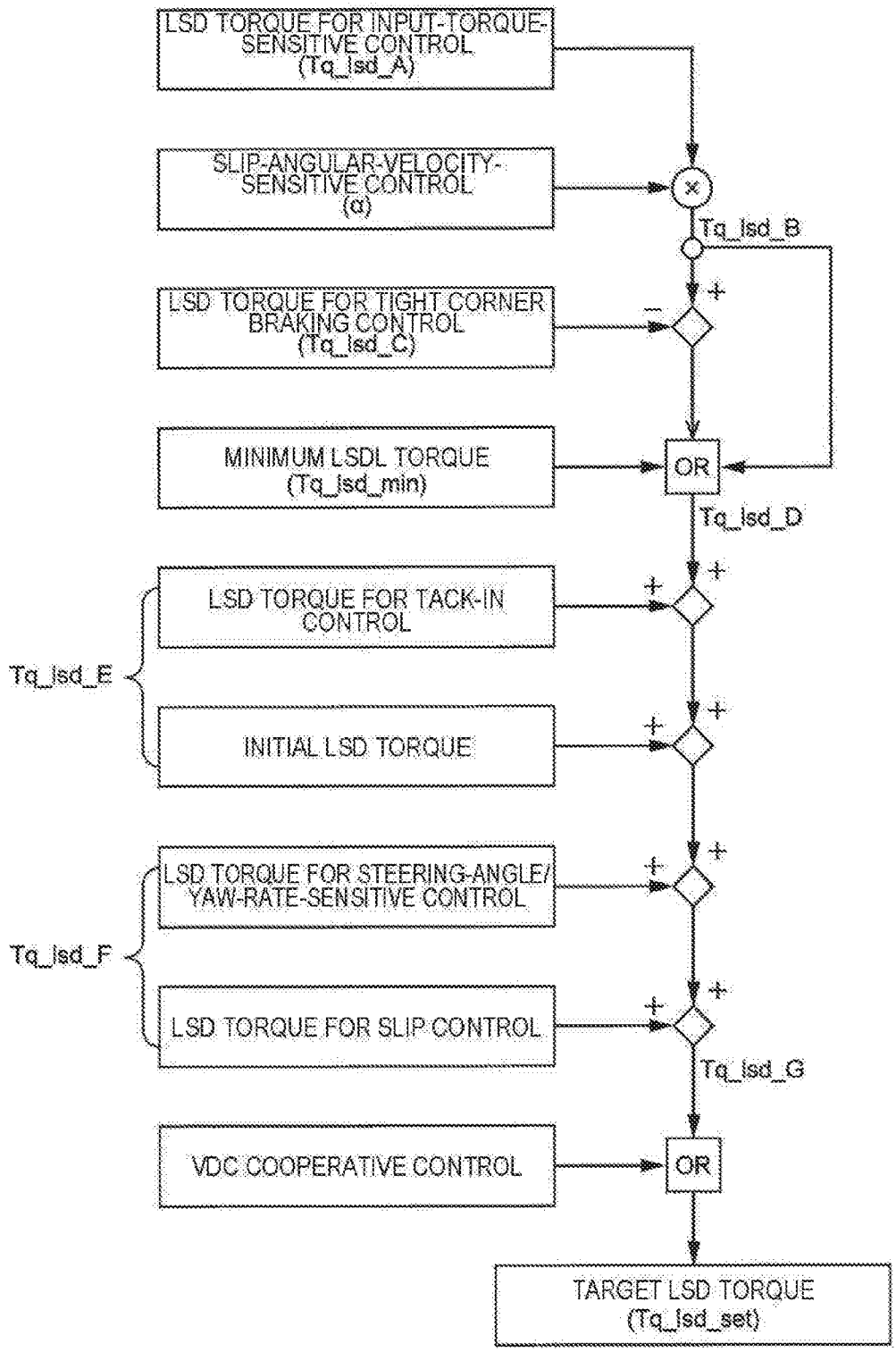
FIG. 4 is an explanatory diagram illustrating a calculation processing procedure for a target LSD torque.
Figure 5:
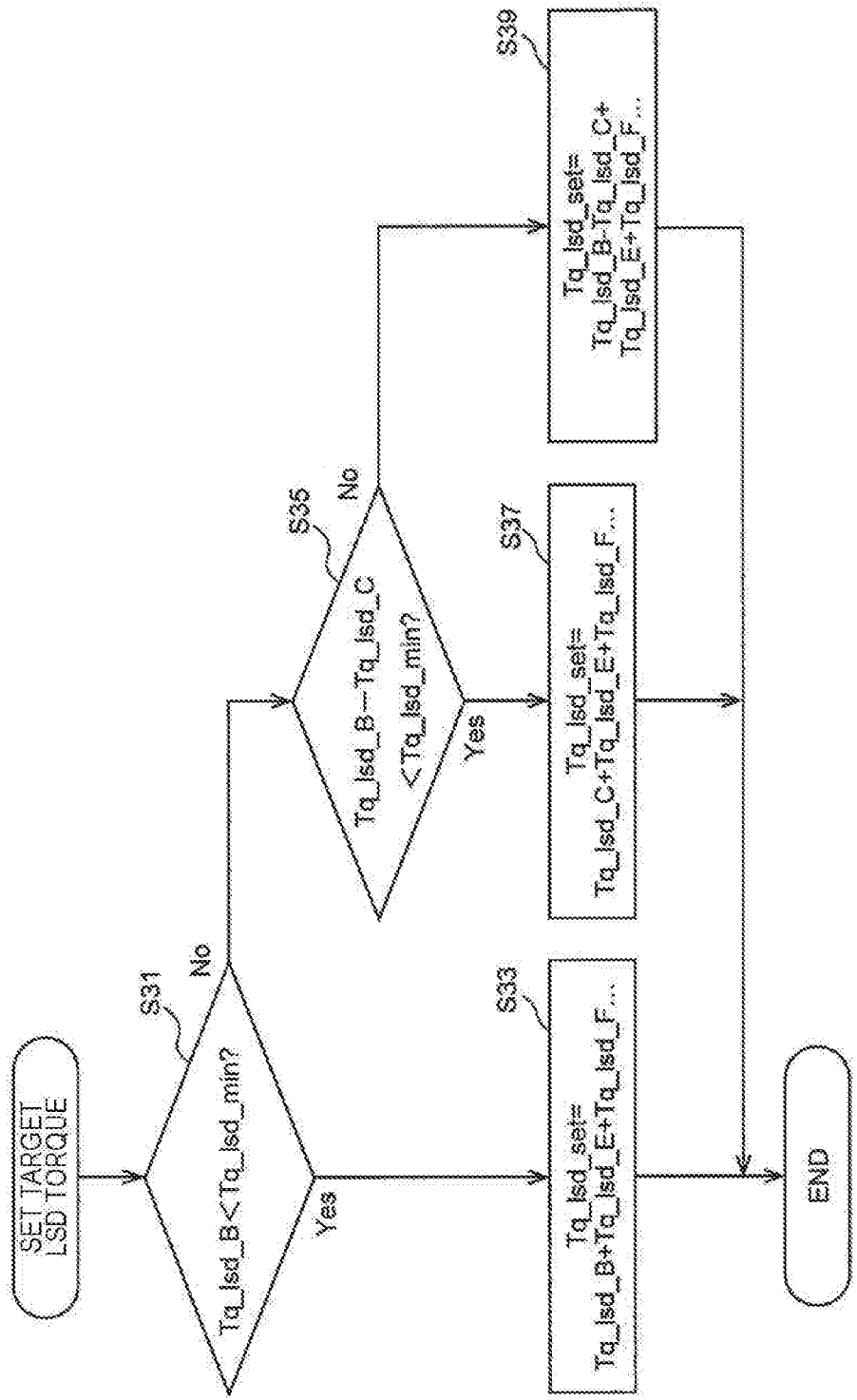
FIG. 5 is a flowchart illustrating a calculation process of a target LSD torque setting module.

FIGS. 3 to 5 are diagrams illustrating an example of a driving control process for the LSD clutch 42 by the LSD clutch control module 120 of the AWDCU 110 according to the present example. FIG. 3 is a flowchart of an arithmetic operation process performed by the LSD clutch control module 120, and FIG. 4 is an explanatory diagram illustrating a schematic calculation method for the target LSD torque Tq_lsd_set. In addition, FIG. 5 is a flowchart of a setting process for the target LSD torque Tq_lsd_set by the target LSD torque setting module 131.

First, the LSD clutch control module 120 acquires various calculation parameters to be used in calculating a target LSD torque (Step S11). For instance, the LSD clutch control module 120 acquires information of a longitudinal acceleration, a lateral acceleration, a yaw rate, and a steering angle θ_str of the steering wheel of the AWD vehicle 4 on the basis of sensor signals of the longitudinal acceleration sensor 63, the lateral acceleration sensor 64, the yaw rate sensor 65, and the steering angle sensor 16. In addition, the LSD clutch control module 120 acquires various kinds of information of an engine speed Ne, an engine shaft torque Tq_eng, an accelerator pedal opening degree Acc, a cooling water temperature T_cool, a wheel speed V_whl, information of an ABS execution flag, a TCS execution flag, and a VDC execution flag, brake information, and the like from the ECU 80, the VDCU 50, and the like via the CAN 100.

Next, the basic LSD torque calculation module 121 calculates a basic LSD torque Tq_lsd_B on the basis of input-torque-sensitive LSD torque Tq_lsd_A for input-torque-sensitive control and a control factor α for slip-angular-velocity-sensitive control (Step S13). The input-torque-sensitive LSD torque Tq_lsd_A is set to a larger value for prevention of the slip phenomenon as a torque input to the center differential unit 40 becomes greater. In addition, the control factor α for slip-angular-velocity-sensitive control is set on the basis of the difference between a yaw rate (a course angular velocity) calculated on the basis of the vehicle speed V and the lateral acceleration and the actual yaw rate acquired from the yaw rate sensor 65.

Next, the subtraction LSD torque calculation module 123 calculates a subtraction LSD torque Tq_lsd_C for curbing the tight corner braking phenomenon on the basis of the vehicle speed V and the steering angle of the steering wheel θ_str (Step S15). The subtraction LSD torque Tq_lsd_C is set to have a larger value for curbing the tight corner braking phenomenon as the vehicle speed V becomes lower or the steering angle of the steering wheel θ_str becomes greater.

Next, the minimum LSD torque calculation module 125 calculates a minimum LSD torque Tq_lsd_min on the basis of a transfer input torque. For instance, the minimum LSD torque calculation module 125 sets a value obtained by multiplying a basic LSD torque Tq_lsd_B calculated on the basis of the input-torque-sensitive LSD torque Tq_lsd_A corresponding to the transfer input torque by a predetermined ratio to the minimum LSD torque Tq_lsd_min. Accordingly, the minimum LSD torque Tq_lsd_min is set in accordance with an acceleration intention of the driver.

Next, the slip prevention LSD torque calculation module 127 calculates a slip prevention LSD torque Tq_lsd_E for preventing slip of the wheels 10FL to 10RR on the basis of various kinds of information (Step S19). For instance, the slip prevention LSD torque calculation module 127 may calculate an LSD torque for tack-in control, an initial LSD torque corresponding to the vehicle speed V, and the like. The value of the LSD torque for tack-in control is added to curb the slip phenomenon in a case in which a tack-in phenomenon occurs, for instance, in a case in which the accelerator pedal is suddenly released when the lateral acceleration of the vehicle body is high. In addition, the value of the initial LSD torque is added to curb the slip phenomenon when the vehicle speed V is high. These values with respect to the slip prevention LSD torque Tq_lsd_E are mostly values approximate to zero when the vehicle speed V is low, i.e., can be values approximate to zero in a situation in which the tight corner braking phenomenon easily occurs.

Next, the slip reduction LSD torque calculation module 129 calculates a slip reduction LSD torque Tq_lsd_F for reducing slip that is occurring in each of the wheels 10FL to 10RR (Step S21) on the basis of the various kinds of information. For instance, the slip reduction LSD torque calculation module 129 may calculate an LSD torque for steering-angle/yaw-rate-sensitive control, an LSD torque for slip control, and the like. A value of the LSD torque for the steering-angle/yaw-rate-sensitive control is added to curb the slip phenomenon in a case in which, for instance, vehicle stability is determined to be deteriorating on the basis of information of the steering angle θ_str, the vehicle speed V, the lateral acceleration, and the yaw rate. In addition, the LSD torque for slip control is added to reduce slip when the slip is occurring in each of the wheels 10FL to 10RR.

Next, the target LSD torque setting module 131 sets the target LSD torque Tq_lsd_set for driving the LSD clutch 42 using each calculated value of the LSD torques obtained up to this point (Step S23). In the AWDCU 110 according to the present example, the target LSD torque Tq_lsd_set (Tq_lsd_G) is obtained by adding the slip prevention LSD torque Tq_lsd_E and the slip reduction LSD torque Tq_lsd_F to Tq_lsd_D which is any value selected from the value which is obtained by subtracting the subtraction LSD torque Tq_lsd_C for curbing the tight corner braking phenomenon from the basic LSD torque Tq_lsd_B, the minimum LSD torque Tq_lsd_min, and the previously obtained basic LSD torque Tq_lsd_B, as illustrated in FIG. 4.

Here, in a case in which the value obtained by subtracting the subtraction LSD torque Tq_lsd_C from the basic LSD torque Tq_lsd_B is larger than or equal to the value of the minimum LSD torque Tq_lsd_min, the value obtained by subtracting the subtraction LSD torque Tq_lsd_C from the basic LSD torque Tq_lsd_B is selected. In addition, in a case in which the value obtained by subtracting the subtraction LSD torque Tq_lsd_C from the basic LSD torque Tq_lsd_B is smaller than the value of the minimum LSD torque Tq_lsd_min, the value of the minimum LSD torque Tq_lsd_min is selected. That is, a value that is larger than or equal to the minimum LSD torque Tq_lsd_min is selected to prevent the value obtained by subtracting the subtraction LSD torque Tq_lsd_C from the basic LSD torque Tq_lsd_B from not being excessively small. However, in a case in which the value of the basic LSD torque Tq_lsd_B is originally smaller than the minimum LSD torque Tq_lsd_min, the value of the basic LSD torque Tq_lsd_B is selected. Table 1 shows values of the LSD torque Tq_lsd_D selected in the calculation process.

TABLE 1

|  | Tq_lsd_B < Tq_lsd_min | Tq_lsd_B ≥ Tq_lsd_min |
|---|---|---|
| Tq_lsd_B − Tq_lsd_C ≥ Tq_lsd_min | Tq_lsd_B | Tq_lsd_B − Tq_lsd_C |
| Tq_lsd_B − Tq_lsd_C < Tq_lsd_min |  | Tq_lsd_min |

Tq_lsd_B: Basic LSD torque
Tq_lsd_C: Subtraction LSD torque
Tq_lsd_min: Minimum LSD torque As shown in Table 1, in the case in which the basic LSD torque Tq_lsd_B is originally smaller than the minimum LSD torque Tq_lsd_min, the basic LSD torque Tq_lsd_B is selected. On the other hand, in a case in which the basic LSD torque Tq_lsd_B is larger than or equal to the minimum LSD torque Tq_lsd_min and the value obtained by subtracting the subtraction LSD torque Tq_lsd_C from the basic LSD torque Tq_lsd_B is larger than or equal to the minimum LSD torque Tq_lsd_min, the value obtained by subtracting the subtraction LSD torque Tq_lsd_C from the basic LSD torque Tq_lsd_B is selected. In addition, in a case in which the value obtained by subtracting the subtraction LSD torque Tq_lsd_C from the basic LSD torque Tq_lsd_B is smaller than the minimum LSD torque Tq_lsd_min, the minimum LSD torque Tq_lsd_min is selected.

In control of the related art in which a minimum LSD torque Tq_lsd_min is not provided, when the vehicle speed V is low and the steering angle of the steering wheel θ_str is large, there are cases in which the subtraction LSD torque Tq_lsd_C for curbing the tight corner braking phenomenon becomes large and thus the LSD torque Tq_lsd_D becomes zero before the slip prevention LSD torque Tq_lsd_E or the slip reduction LSD torque Tq_lsd_F is added. On the other hand, in the AWDCU 110 according to the present example, an LSD torque that is larger than or equal to the minimum LSD torque Tq_lsd_C is left even in a case in which the value obtained by subtracting the subtraction LSD torque Tq_lsd_C from the basic LSD torque Tq_lsd_B is used as the LSD torque Tq_lsd_D before the slip prevention LSD torque Tq_lsd_E or the slip reduction LSD torque Tq_lsd_F is added.

Each of the slip prevention LSD torque Tq_lsd_E and the slip reduction LSD torque Tq_lsd_F is added to the value of the LSD torque Tq_lsd_D selected as described above, and thereby the target LSD torque Tq_lsd_set (Tq_lsd_G) is calculated.

To describe an example of a flowchart of the setting process of the target LSD torque Tq_lsd_set by the target LSD torque setting module 131 with reference to FIG. 5, first, the target LSD torque setting module 131 determines whether the basic LSD torque Tq_lsd_B is smaller than the minimum LSD torque Tq_lsd_min (Step S31). In a case in which the basic LSD torque Tq_lsd_B is smaller than the minimum LSD torque Tq_lsd_min (Yes in S31), the target LSD torque setting module 131 sets the value obtained by adding the slip prevention LSD torque Tq_lsd_E, the slip reduction LSD torque Tq_lsd_F, and the like to the basic LSD torque Tq_lsd_B as the target LSD torque Tq_lsd_set (Step S33).

On the other hand, in a case in which the basic LSD torque Tq_lsd_B is larger than or equal to the minimum LSD torque Tq_lsd_min (No in S31), the target LSD torque setting module 131 determines whether the value obtained by subtracting the subtraction LSD torque Tq_lsd_C from the basic LSD torque Tq_lsd_B is smaller than the minimum LSD torque Tq_lsd_min (Step S35). In a case in which the value obtained by subtracting the subtraction LSD torque Tq_lsd_C from the basic LSD torque Tq_lsd_B is smaller than the minimum LSD torque Tq_lsd_min (Yes in S35), the target LSD torque setting module 131 sets the value obtained by adding the slip prevention LSD torque Tq_lsd_E, the slip reduction LSD torque Tq_lsd_F, and the like to the minimum LSD torque Tq_lsd_min as the target LSD torque Tq_lsd_set (Step S37).

On the other hand, in a case in which the value obtained by subtracting the subtraction LSD torque Tq_lsd_C from the basic LSD torque Tq_lsd_B is larger than or equal to the minimum LSD torque Tq_lsd_min (No in S35), the target LSD torque setting module 131 sets the value obtained by adding the slip prevention LSD torque Tq_lsd_E, the slip reduction LSD torque Tq_lsd_F, and the like to the value obtained by subtracting the subtraction LSD torque Tq_lsd_C from the basic LSD torque Tq_lsd_B as the target LSD torque Tq_lsd_set (Step S39).

However, in a case in which the obtained target LSD torque Tq_lsd_set (Tq_lsd_G) is smaller than an LSD torque required value for VDC cooperative control of the ABS, the TCS, and the VDC set by the VDCU 50, the target LSD torque setting module 131 of the AWDCU 110 according to the present example sets the LSD torque required value for the VDC cooperative control as the target LSD torque Tq_lsd_set as illustrated in FIG. 4.

Returning to the flowchart of FIG. 3, when the target LSD torque Tq_lsd_set is set in Step S23, the clutch control module 133 generates a drive instruction signal for the LSD clutch 42 on the basis of the target LSD torque Tq_lsd_set and outputs the signal to the LSD clutch drive module 140 (Step S25). As a result, the LSD clutch drive module 140 that has received the drive instruction adjusts the engaging force of the LSD clutch 42.

Figure 6:
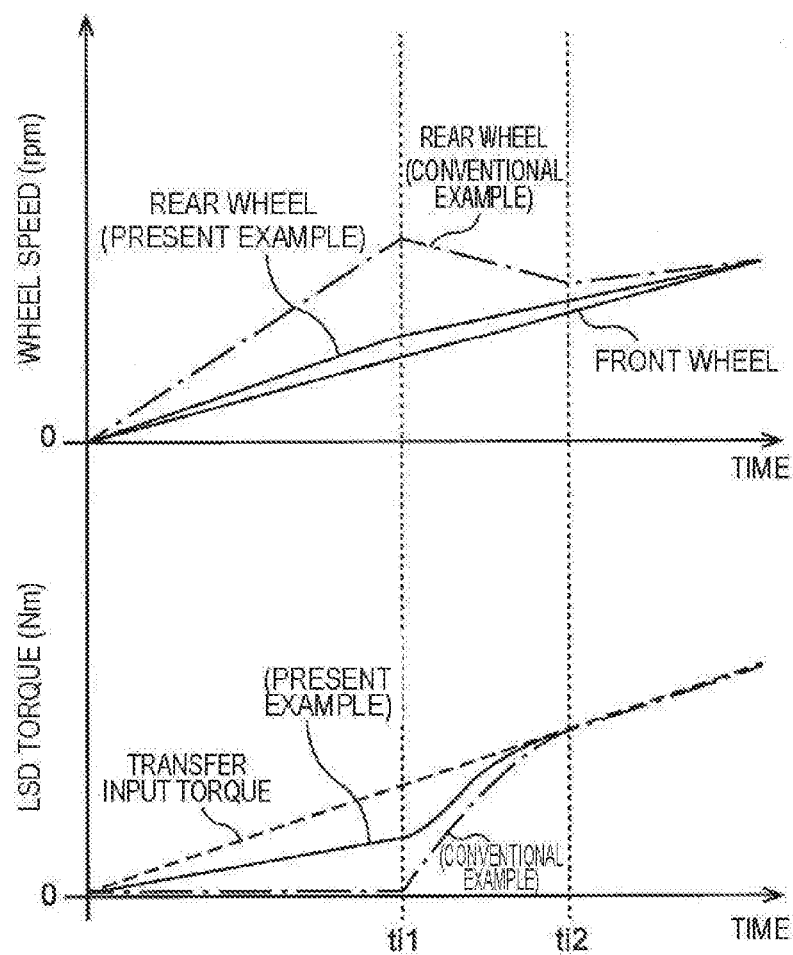
FIG. 6 is an explanatory diagram illustrating an effect caused by setting a minimum LSD torque.

Next, effects of LSD clutch control by the AWDCU 110 according to the present example will be described with reference to FIG. 6. FIG. 6 illustrates the change of the wheel speed V_whl and the value of the LSD torque obtained by subtracting the subtraction LSD torque Tq_lsd_C from the basic LSD torque Tq_lsd_B in a case in which the accelerator pedal opening degree Acc gradually increases in a situation in which the steering angle of the steering wheel θ_str is large when the AWD vehicle 4 travels on a road surface with low friction.

Since the basic LSD torque Tq_lsd_B is relatively small and the subtraction LSD torque Tq_lsd_C for curbing the tight corner braking phenomenon is large while the vehicle speed V is low, the LSD torque during the period to a time ti1 is zero in a conventional example in which no minimum LSD torque is set. Since the basic LSD torque Tq_lsd_B increases and the subtraction LSD torque Tq_lsd_C decreases along an increase of the vehicle speed V from the time ti1, the LSD torque gradually increases. In addition, at a time ti2 at which the vehicle speed V further increases, the LSD torque has the value equivalent to the transfer input torque. In the conventional example, since the LSD torque is zero in the period in which the vehicle speed V is low and thus a differential between the front and rear wheels is not limited, the speed of the rear wheels is significantly higher than the speed of the front wheels, and thereby slip of the rear wheels occurs.

Meanwhile, in the present example in which the minimum LSD torque Tq_lsd_min is set, the LSD torque is set to have a predetermined large value exceeding zero in accordance with the transfer input torque even in the period in which the vehicle speed V is low (the period to the time ti1). Accordingly, even in a case in which the vehicle speed V is low and the steering angle of the steering wheel θ_str is large, a differential between the front and rear wheels is appropriately limited and thus the slip phenomenon is curbed. Thus, it is possible to stop the rear wheel speed from being significantly higher than the front wheel speed. As described above, according to the LSD clutch control by the AWDCU 110 according to the present example, in a period in which the driver has a weak intention of acceleration and the transfer input torque is relatively small, control is performed such that the LSD torque does not become substantially zero although the LSD torque is weakened to curb the tight corner braking phenomenon, and thus the slip phenomenon of the wheels 10 is curbed. In addition, according to the LSD clutch control by the AWDCU 110, in a period in which the driver has a strong intention of acceleration and the transfer input torque is relatively large, the LSD torque is strengthened and thus the slip phenomenon of the wheels 10 is curbed.

As described above, the AWDCU 110 as a control apparatus for the center differential unit 40 of the AWD vehicle 4 according to the present example can prevent the target LSD torque Tq_lsd_set from being excessively small due to the subtraction LSD torque Tq_lsd_C for curbing the tight corner braking phenomenon when setting an engaging force of the LSD clutch 42. That is, even in a case in which the AWDCU 110 uses the value obtained by subtracting the subtraction LSD torque Tq_lsd_C from the basic LSD torque Tq_lsd_B as the LSD torque Tq_lsd_D before the slip prevention LSD torque Tq_lsd_E and the slip reduction LSD torque Tq_lsd_F are added, the calculation is performed so that an LSD torque that is larger than or equal to the minimum LSD torque Tq_lsd_C is left.

Since the minimum LSD torque Tq_lsd_min is set to a value proportional to the transfer input torque, the target LSD torque Tq_lsd_set is set to a large value in a case in which the transfer input torque is large, and thus the slip phenomenon of the wheels 10 is curbed. Note that, since the driver has an intention of acceleration in a case in which the transfer input torque is large, the tight corner braking phenomenon is tolerated to some degree. On the other hand, even in a case in which the transfer input torque is small and the value obtained by subtracting the subtraction LSD torque $Tq\_lsd\_C$ for curbing the tight corner braking phenomenon from the basic LSD torque $Tq\_lsd\_B$ is used, an LSD torque greater than or equal to the minimum LSD torque $Tq\_lsd\_min$ is left. Accordingly, slip of the wheels 10 caused by an excessively small target LSD torque $Tq\_lsd\_set$ can be reduced. As described above, according to the AWDCU 110 of the present example, it is possible to realize curb of the tight corner braking phenomenon and the slip phenomenon with a proper balance by adjusting the LSD torque, and thus both the curb of the tight corner braking phenomenon and the curb of the slip phenomenon of the wheels 10 can be achieved.

In addition, since the minimum LSD torque $Tq\_lsd\_min$ is set on the basis of the transfer input torque, it is possible to set the target LSD torque $Tq\_lsd\_set$ in consideration of an intention of acceleration of the driver more appropriately than, for instance, a case in which the LSD torque is adjusted on the basis of friction of a road surface or the like. Therefore, the AWDCU 110 according to the present example can achieve both the curb of the tight corner braking phenomenon and the curb of the slip phenomenon of the wheels 10 while determining whether the tight corner braking phenomenon is tolerated.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

In the procedure of the calculation process of the target LSD torque $Tq\_lsd\_set$ illustrated in FIG. 4, for instance, the orders of the addition step and the comparison step may be interchanged with each other. In addition, some of the steps of the flowchart illustrated in FIG. 3 or FIG. 5 may be interchanged with each other.

In addition, although the vehicle is a full-time AWD vehicle in the above-described example, the present invention is not limited thereto. The vehicle may be, for instance, a part-time AWD vehicle having a main drive wheel that is directly connected with the engine and driven wheels that are coupled to the engine via a transfer clutch that can switch between two-wheel drive and four-wheel drive by adjusting a distribution of a driving force to the driven wheels by controlling an engaging force of the transfer clutch in accordance with a road surface condition, a running state, or the like. In addition, although the AWD vehicle 4 is an AWD vehicle that is capable of executing ABS control, TCS control and VDC control in the above-described example, the AWD vehicle may be an AWD vehicle that is not capable of executing one or a plurality of kinds of the brake control and the attitude control.

In addition, a configuration of the center differential unit 40 is not limited to the above-described example, and may be another type of center differential unit. Furthermore, although the LSD clutch 42 is an electromagnetic clutch in the above-described example, the LSD clutch may be a hydraulic clutch. Furthermore, the configuration of the driving force transmission system described in the above example is merely an instance, and is not limited thereto.

The invention claimed is:

1. A control apparatus for a limited-slip differential for front and rear wheels of a vehicle, the control apparatus comprising:
a basic LSD torque calculation module configured to calculate a basic LSD torque at least on a basis of a transfer input torque;
a subtraction LSD torque calculation module configured to calculate a subtraction LSD torque that is subtracted from the basic LSD torque at least on a basis of a vehicle speed and a steering angle;
a minimum LSD torque calculation module configured to calculate a minimum LSD torque on the basis of the transfer input torque;
a target LSD torque setting module configured to set a target LSD torque at least on a basis of the basic LSD torque, the subtraction LSD torque, and the minimum LSD torque; and
a clutch control module configured to control an engaging force of a clutch configured to freely limit a differential of the front and rear wheels in accordance with the engaging force on a basis of the target LSD torque.

2. The control apparatus for a limited-slip differential for front and rear wheels of a vehicle according to claim 1, wherein the target LSD torque setting module sets the basic LSD torque as the target LSD torque in a case in which the basic LSD torque is smaller than the minimum LSD torque.

3. The control apparatus for a limited-slip differential for front and rear wheels of a vehicle according to claim 1, wherein the target LSD torque setting module sets, as the target LSD torque, a value obtained by subtracting the subtraction LSD torque from the basic LSD torque in a case in which the basic LSD torque is larger than or equal to the minimum LSD torque.

4. The control apparatus for a limited-slip differential for front and rear wheels of a vehicle according to claim 2, wherein the target LSD torque setting module sets, as the target LSD torque, a value obtained by subtracting the subtraction LSD torque from the basic LSD torque in a case in which the basic LSD torque is larger than or equal to the minimum LSD torque.

5. The control apparatus for a limited-slip differential for front and rear wheels of a vehicle according to claim 1, wherein the target LSD torque setting module sets the minimum LSD torque as the target LSD torque in a case in which the basic LSD torque is larger than or equal to the minimum LSD torque.

6. The control apparatus for a limited-slip differential for front and rear wheels of a vehicle according to claim 2, wherein the target LSD torque setting module sets the minimum LSD torque as the target LSD torque in a case in which the basic LSD torque is larger than or equal to the minimum LSD torque.

7. The control apparatus for a limited-slip differential for front and rear wheels of a vehicle according to claim 3, wherein the target LSD torque setting module sets the minimum LSD torque as the target LSD torque in a case in which the basic LSD torque is larger than or equal to the minimum LSD torque.

8. The control apparatus for a limited-slip differential for front and rear wheels of a vehicle according to claim 4, wherein the target LSD torque setting module sets the minimum LSD torque as the target LSD torque in a case in which the basic LSD torque is larger than or equal to the minimum LSD torque.

9. The control apparatus for a limited-slip differential for front and rear wheels of a vehicle according to claim 1, wherein the minimum LSD torque calculation module calculates the minimum LSD torque on the basis of the basic LSD torque calculated by the basic LSD torque calculation module.

10. The control apparatus for a limited-slip differential for front and rear wheels of a vehicle according to claim 2, wherein the minimum LSD torque calculation module calculates the minimum LSD torque on the basis of the basic LSD torque calculated by the basic LSD torque calculation module.

11. The control apparatus for a limited-slip differential for front and rear wheels of a vehicle according to claim 3, wherein the minimum LSD torque calculation module calculates the minimum LSD torque on the basis of the basic LSD torque calculated by the basic LSD torque calculation module.

12. The control apparatus for a limited-slip differential for front and rear wheels of a vehicle according to claim 4, wherein the minimum LSD torque calculation module calculates the minimum LSD torque on the basis of the basic LSD torque calculated by the basic LSD torque calculation module.

13. The control apparatus for a limited-slip differential for front and rear wheels of a vehicle according to claim 9, wherein the minimum LSD torque calculation module sets, as the minimum LSD torque, a value obtained by multiplying the basic LSD torque, which is calculated by the basic LSD torque calculation module, by a predetermined ratio.

14. The control apparatus for a limited-slip differential for front and rear wheels of a vehicle according to claim 10, wherein the minimum LSD torque calculation module sets, as the minimum LSD torque, a value obtained by multiplying the basic LSD torque, which is calculated by the basic LSD torque calculation module, by a predetermined ratio.

15. The control apparatus for a limited-slip differential for front and rear wheels of a vehicle according to claim 11, wherein the minimum LSD torque calculation module sets, as the minimum LSD torque, a value obtained by multiplying the basic LSD torque, which is calculated by the basic LSD torque calculation module, by a predetermined ratio.

16. The control apparatus for a limited-slip differential for front and rear wheels of a vehicle according to claim 12, wherein the minimum LSD torque calculation module sets, as the minimum LSD torque, a value obtained by multiplying the basic LSD torque, which is calculated by the basic LSD torque calculation module, by a predetermined ratio.

17. A control apparatus for a limited-slip differential for front and rear wheels of a vehicle, the control apparatus comprising
circuitry configured to
calculate a basic LSD torque at least on a basis of a transfer input torque,
calculate a subtraction LSD torque that is subtracted from the basic LSD torque at least on a basis of a vehicle speed and a steering angle,
calculate a minimum LSD torque on the basis of the transfer input torque,
set a target LSD torque at least on a basis of the basic LSD torque, the subtraction LSD torque, and the minimum LSD torque, and
control an engaging force of a clutch configured to freely limit a differential of the front and rear wheels in accordance with the engaging force on a basis of the target LSD torque.

\* \* \* \* \*